United States Patent
Chen et al.

(10) Patent No.: US 9,610,616 B2
(45) Date of Patent: Apr. 4, 2017

(54) CLEANING APPARATUS FOR A MODEL

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Peng-Yang Chen, New Taipei (TW); Wen-Ten Lin, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 209 days.

(21) Appl. No.: 14/497,647

(22) Filed: Sep. 26, 2014

(65) Prior Publication Data

US 2016/0059270 A1 Mar. 3, 2016

(30) Foreign Application Priority Data

Aug. 28, 2014 (TW) .............................. 103129635 A

(51) Int. Cl.
*B08B 3/02* (2006.01)
*B33Y 40/00* (2015.01)
*B29C 67/00* (2017.01)

(52) U.S. Cl.
CPC ............ *B08B 3/02* (2013.01); *B29C 67/0096* (2013.01); *B33Y 40/00* (2014.12)

(58) Field of Classification Search
None
See application file for complete search history.

(56) References Cited

U.S. PATENT DOCUMENTS 3,036,320 A * 5/1962 Behrendt ................. A63D 5/10
15/21.1
4,299,245 A * 11/1981 Clapper .................... B08B 3/02
118/318

(Continued)

FOREIGN PATENT DOCUMENTS

JP H11226523 A 8/1999
TW 201008669 A 3/2010

OTHER PUBLICATIONS

Office Action dated Jul. 21, 2015 of the corresponding Taiwan patent application.

*Primary Examiner* — David Cormier
*Assistant Examiner* — Cristi Tate-Sims
(74) *Attorney, Agent, or Firm* — Chun-Ming Shih; HDLS IPR Services

(57) ABSTRACT

A cleaning apparatus is used for a carrier and a model is fixed on the carrier. The cleaning apparatus includes a case body, a sprinkling unit, a switching valve, and a rotating mechanism. The case body has an opening disposed at a top thereof, an outlet disposed at a bottom thereof, and a receiving space disposed between the opening and the outlet. The sprinkling unit is installed in the case body and has plural nozzles configured corresponding to the receiving space. The switching valve is installed at the outlet to open or close the outlet. The rotating mechanism is configured corresponding to the opening and connected to the carrier and is able to drive the carrier in which the model passes through the opening and is disposed in the receiving space. Thus, the safety, stability, and convenience of the model clean-up are improved.

10 Claims, 4 Drawing Sheets

(56) References Cited

U.S. PATENT DOCUMENTS

| | | | | |
|---|---|---|---|---|
| 4,983,223 A | * | 1/1991 | Gessner | C23G 5/04 134/105 |
| 5,903,944 A | * | 5/1999 | Burrell | A46B 13/04 134/167 R |
| 2002/0166578 A1 | * | 11/2002 | Leblond | A46B 13/001 134/99.2 |
| 2004/0123885 A1 | * | 7/2004 | Myong | B08B 9/28 134/168 R |
| 2010/0310786 A1 | * | 12/2010 | Dunne | A61C 13/0004 427/487 |
| 2013/0306104 A1 | * | 11/2013 | Byrne | E03B 9/18 134/6 |

* cited by examiner

CLEANING APPARATUS FOR A MODEL

BACKGROUND OF THE INVENTION

Field of the Invention

The present invention relates to a cleaning apparatus and, in particular, to a cleaning apparatus used for a model.

Description of Related Art 3D printing, also called additive manufacturing (AM), is a rapid forming technology. Starting with a digital model file, the 3D printing constructs an object, layer by layer, using bondable materials such as metal powder and plastic based on the parameters of the model file. Finally, a real three-dimension model having any shape is made. This method is called "layer-forming."

The manufactured model needs a manual clean-up by a worker. However, the manual clean-up suffers from the following disadvantages. First, the photosensitive resin on the model is harmful to the human body. Second, different workers have different clean-up ways, which likely results in defects in the model caused by an over clean-up such as a deformation, crack, or rough surface; it also likely results in other defects in the model caused by an under clean-up such as a slim surface or residual odor.

In view of foregoing, the inventor pays special attention to the above existing technology and researches with the application of related theory to overcome the above disadvantages regarding the above related art, which becomes the goal of the inventor's improvement.

SUMMARY OF THE INVENTION

It is an objective of the present invention to provide a cleaning apparatus to clean up a model such that the safety, stability, and convenience of the model clean-up are improved In an embodiment, the present invention provides a cleaning apparatus used for a carrier and a model fixed on the carrier. The cleaning apparatus comprises a case body having an opening disposed at a top thereof, an outlet disposed at a bottom thereof, and a receiving space disposed between the opening and the outlet; a sprinkling unit installed in the case body, the sprinkling unit having a plurality of nozzles which are configured corresponding to the receiving space; a switching valve installed at the outlet to open or close the outlet; and a rotating mechanism configured corresponding to the opening and connected to the carrier and being able to drive the carrier in which the model passes through the opening and is disposed in the receiving space.

The present invention also has the effects as follows.

First, the present invention uses the cleaning apparatus for a model to perform the clean-up, which prevents workers from exposing to the photosensitive resin and the resulting injury. Consequently, the cleaning apparatus ensures an improved operational safety.

Second, the cleaning apparatus performs the clean-up mechanically, which prevents the model from suffering the defects caused by the over clean-up such as a deformation, crack, or rough surface, or the defects caused by the under clean-up such as a slim surface or residual odor. Consequently, the cleaning apparatus ensures better operational stability and convenience.

Third, the cleaning apparatus permits the reuse of the cleaning liquid, which ensures an environment-friendly and cost saving cleaning apparatus.

DETAILED DESCRIPTION OF THE INVENTION

The detailed description and technical content of the present invention will be explained below with reference to accompanying figures. However, the accompanying figures are only for reference and explanation, but not to limit the scope of the present invention.

Figure 1:
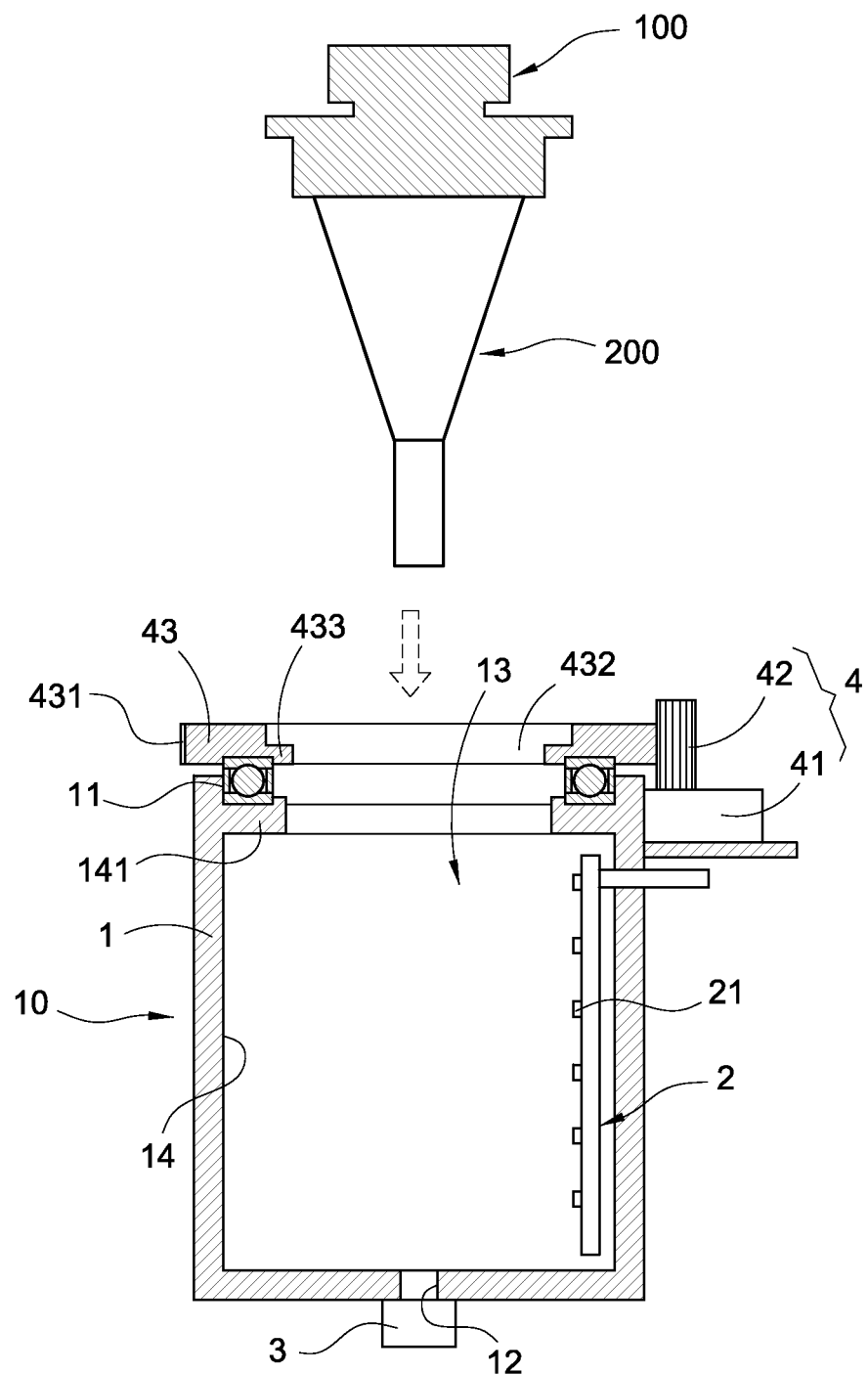
FIG. 1 is cross-sectional schematic view of the cleaning apparatus for a model of the present invention.
Figure 2:
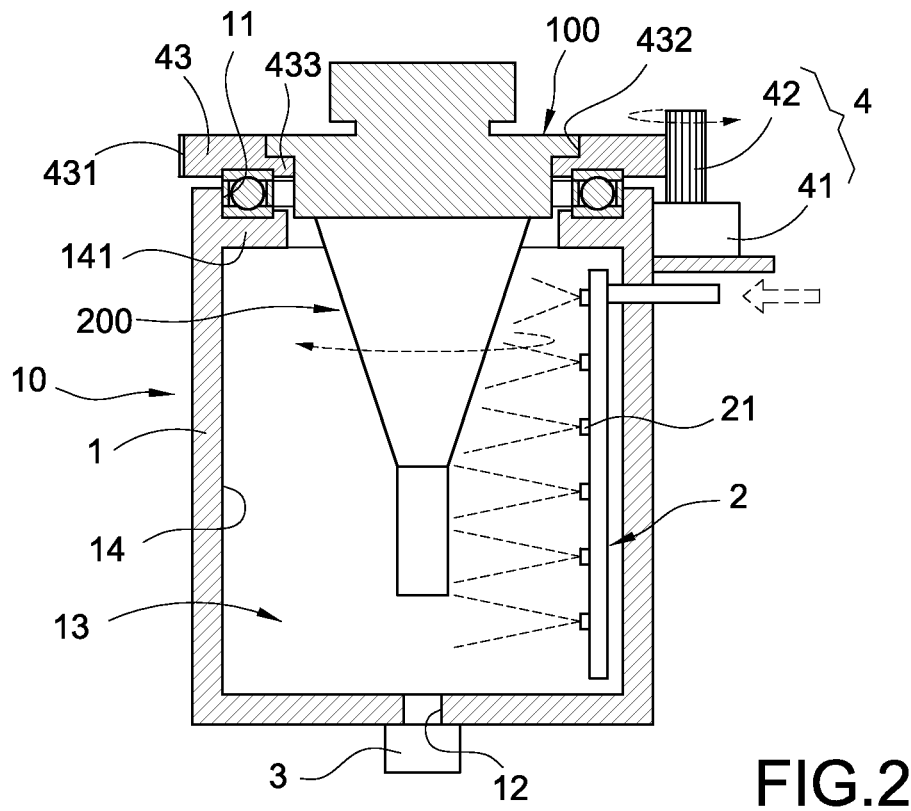
FIG. 2 is a schematic view of the cleaning apparatus for a model of the present invention in operation.
Figure 3:
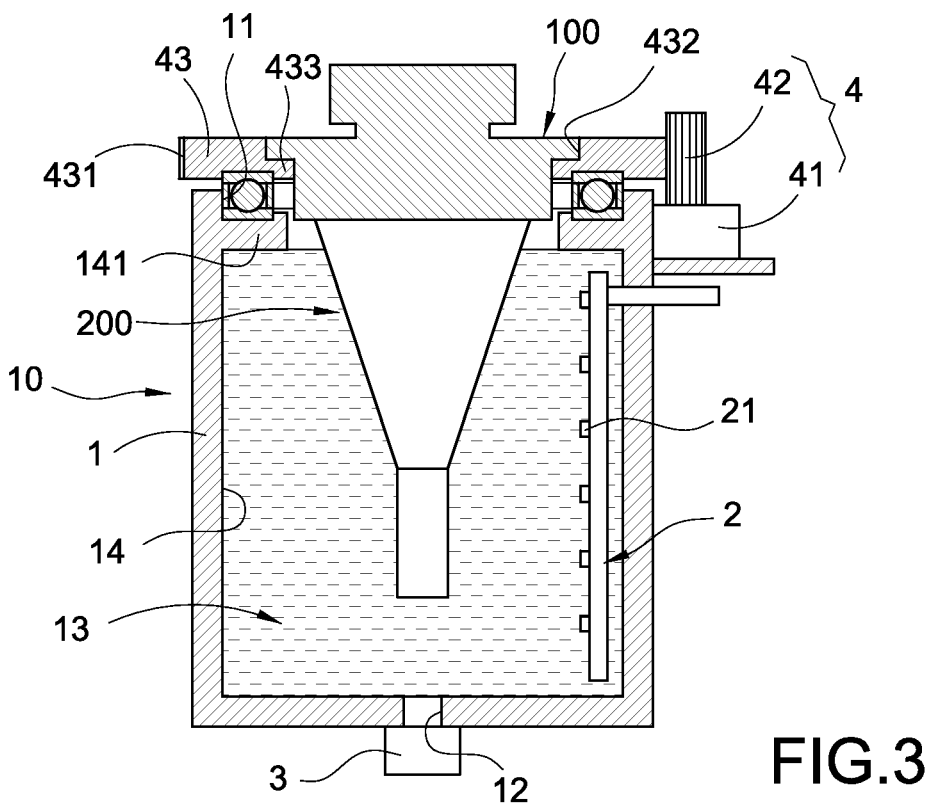
FIG. 3 is another schematic view of the cleaning apparatus for a model of the present invention in operation.

Please refer to FIGS. 1-3. The present invention provides a cleaning apparatus for a model. The cleaning apparatus for a model comprises a case body 1, a sprinkling unit 2, a switching valve 3, and a rotating mechanism 4. The cleaning apparatus is used for a carrier 100 and a model 200. The model 200 is fixed on the carrier 100.

The case body 1 has an opening 11 disposed at a top thereof, an outlet 12 disposed at a bottom thereof, and a receiving space 13 disposed between the opening 11 and the outlet 12. The case body 1 has an inner annular wall 14 which extends along an inner perimeter thereof to form at least one positioning block 141 in which the carrier 100 rests against the positioning block 141 and can rotate with respect to the positioning block 141.

The sprinkling unit 2 is installed in the case body 1 and connected to a pipe of cleaning liquid. The sprinkling unit 2 has a plurality of nozzles 21 which are configured corresponding to the receiving space 13. The switching valve 3 is installed at the outlet 12 and covers the outlet 12. The switching valve 3 can seal or release the outlet to control the closing or opening of the outlet 12.

The rotating mechanism 4 is configured corresponding to the opening 11 and connected to the carrier 100 and able to rotate the carrier 100. The model 200 passes through the opening 11 and is disposed in the receiving space 13.

The detailed explanation is given below. The rotating mechanism 4 comprises a driver 41, a gear part 42, and a rotating disk 43. The driver 41 drives the gear part 42 to rotate; the rotating disk 43 is configured corresponding to the opening 11 and can be fixed to the carrier 100. The rotating disk 43 has an external gear 431 around an outer perimeter thereof; the gear part 42 is engaged with the external gear 431 to rotate the rotating disk 43.

Besides, the rotating disk 43 has a throughhole 432 configured corresponding to the opening 11. An inner wall of the throughhole 432 extends to form a stopper 433. The carrier 100 passes through the throughhole 432 and is stopped and positioned by the stopper 433 such that when the rotating disk 43 rotates, the carrier 100 and the model 200 will rotate with the rotating disk 43 accordingly.

As shown in FIGS. 1-3, the combination of the cleaning apparatus of the present invention uses the case body 1 which has an opening 11 disposed at a top thereof, an outlet 12 disposed at a bottom thereof, and a receiving space 13 disposed between the opening 11 and the outlet 12; the sprinkling unit 2 which is installed in the case body 1 and has nozzles 21 configured corresponding to the receiving space 13; the switching valve 3 which is installed at the outlet 12 to control the opening and closing of the outlet 12; and the rotating mechanism 4 which is configured corresponding to the opening 11 and connected to the carrier 100 and is able to rotate the carrier 100 in which the model 200 passes through the opening 11 and is disposed in the receiving space 13. In this way, the model 200 is cleaned up using the cleaning apparatus 10, which improves the safety, stability, and convenience of the model clean-up.

FIGS. 2 and 3 show the operation of the cleaning apparatus 10 of the present invention. First, the external gear 431 of the rotating disk 43 and the gear part 42 of the rotating mechanism 4 are engaged with each other. The carrier 100 passes through the throughhole 432 and is stopped and positioned by the stopper 433. As a result, the model 200 passes through the opening 11 and is disposed in the receiving space 13 such that when the rotating disk 43 rotates, the carrier 100 and the model 200 will rotate with the rotating disk 43 accordingly.

Second, when the cleaning apparatus 10 operates, the nozzles 21 spray the cleaning liquid corresponding to the model 200 for the clean-up. The driver 41 drives the rotating disk 43 and the carrier 100 to rotate through the gear part 42 and thus the model 200 rotates by 360° such that the model 200 is cleaned up by the nozzles 21 from different angles. Consequently, the photosensitive resin and debris on the model 200 are washed away from the model 200.

Third, the switching valve 3 seals the outlet 12 and closes the outlet 12 such that the cleaning liquid injected by the nozzles 21 fills the case body 1 to soak the model 200. Meanwhile, the driver 41 drives the rotating disk 43 and the carrier 100 to rotate and the model 200 is then thoroughly cleaned up. Also, the driver 41 may stop rotating the rotating disk 43 and the carrier 100 to keep the model 200 stationary and soaked in the cleaning liquid.

Finally, the switching valve 3 releases the outlet 12 to control the opening of the outlet 12 to discharge the cleaning liquid through the outlet 12 to complete the clean-up. Then, the model 200 is removed out of the cleaning apparatus 10 through the opening 11.

Therefore, compared with the traditional manual clean-up, the cleaning apparatus 10 of the present invention prevents the worker from exposing to the photosensitive resin and the resulting injury to the human body, which ensures an improved operational safety.

In addition, the cleaning apparatus 10 performs the clean-up mechanically, reducing the uncertainty such as human unstable operation, to prevent the model 200 from deforming, cracking, or producing a rough surface which are caused by an over clean-up or to prevent the model 200 from producing a slimy surface or residual odor which are caused by an under clean-up. Thus, the cleaning apparatus 10 ensures better operational stability and convenience.

Figure 4:
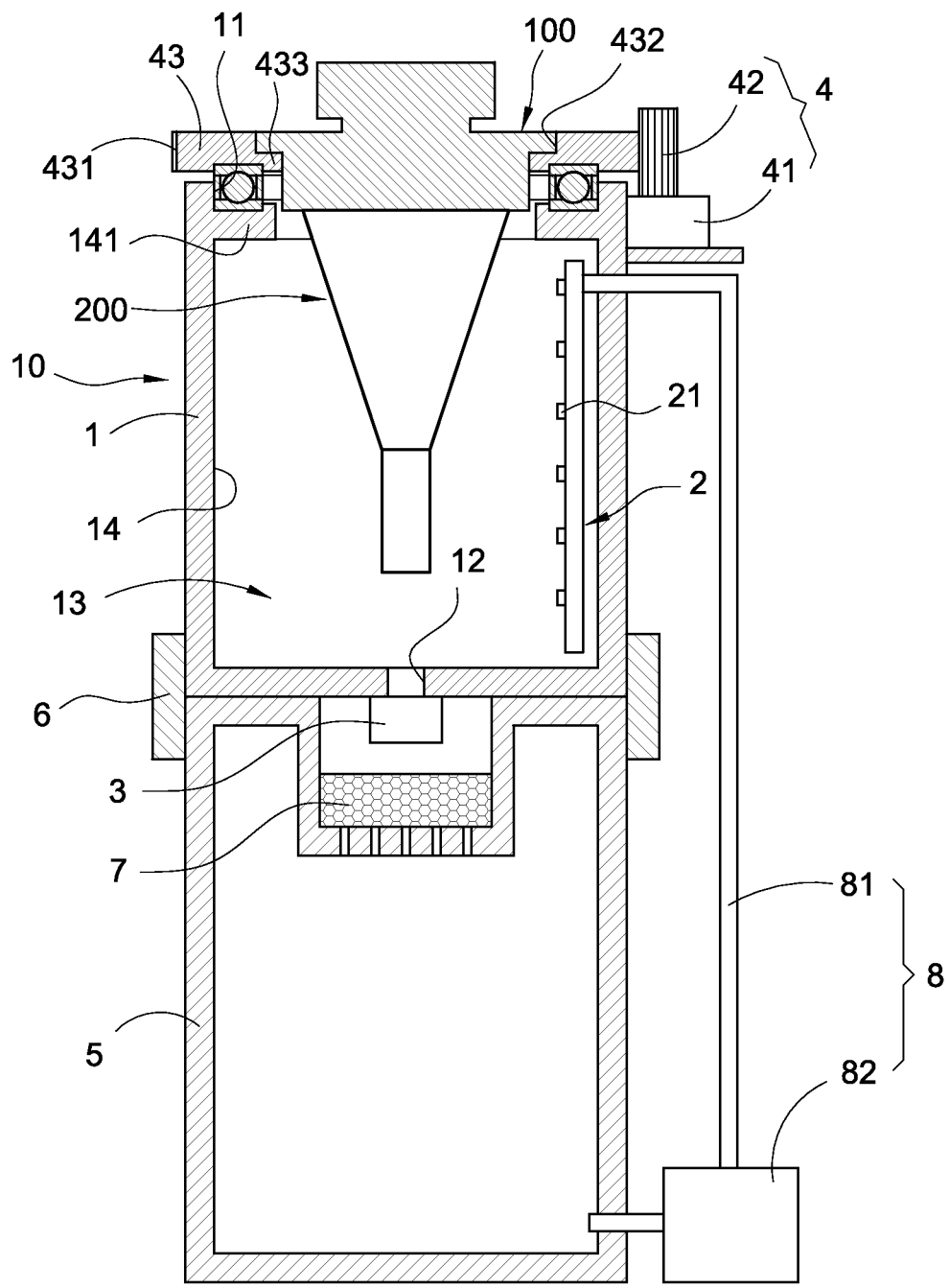
FIG. 4 is a cross-sectional schematic view of the cleaning apparatus for a model according to another embodiment of the present invention.
Figure 5:
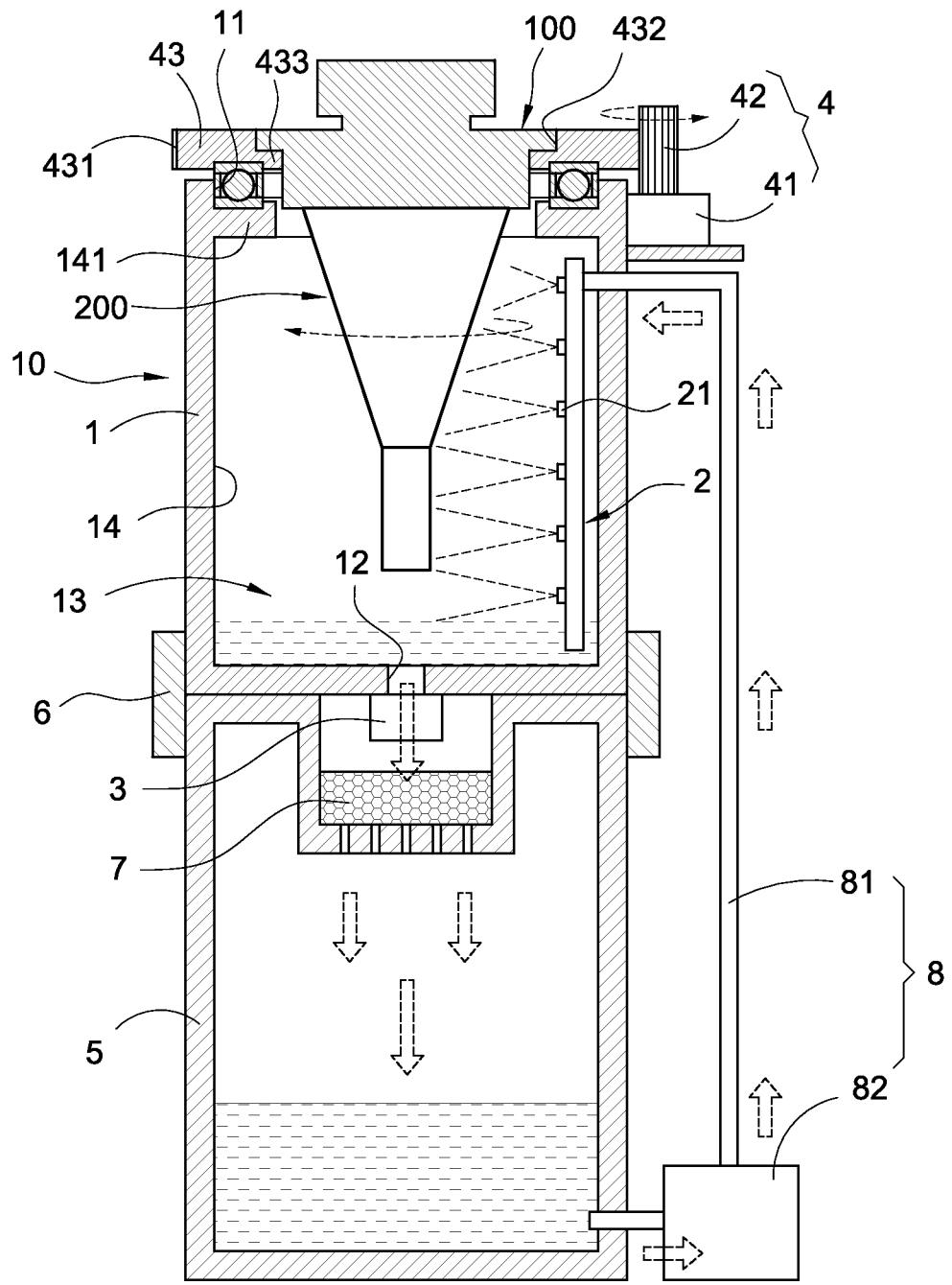
FIG. 5 is a cross-sectional schematic view of the cleaning apparatus for a model according to another embodiment of the present invention in operation.

Please refer to FIGS. 4 and 5, which show the cleaning apparatus for a model according to another embodiment of the present invention. The embodiment of FIGS. 1-3 is roughly similar to that of FIGS. 4 and 5. The difference is that the embodiment of FIGS. 4 and 5 further comprises a liquid container 5, a connecting unit 6, a filter unit 7, and a circulation unit 8.

The detailed explanation is given below. The liquid container 5 is configured corresponding to the outlet 12. The connecting unit 6 correspondingly connects the case body 1 and the liquid container 5 such that the liquid container 5 is fixed to the case body 1 through the connecting unit 6. The filter unit 7 is configured between the outlet 12 and the liquid container 5. The circulation unit 8 is connected to the liquid container 5 and the sprinkling unit 2. The circulation unit 8 comprises a circulation pipe 81 and a pump 82 which are connected to each other; the circulation pipe 81 is connected to the liquid container 5 and the sprinkling unit 2.

In this way, the cleaning liquid is discharged from the outlet 12 and filtered through the filter unit 7 and flows into the liquid container 5. Then, the pump 82 and the circulation pipe 81 deliver the cleaning liquid in the liquid container 5 to the sprinkling unit 2, which permits the reuse of the cleaning liquid and ensures an environment-friendly and cost saving cleaning apparatus.

In summary, the cleaning apparatus for a model of the present invention which is not anticipated by similar products and not used in public is indeed novel, useful, and non-obvious to be patentable. Please examine the application carefully and grant it as a formal patent for protecting the rights of the inventor.

What is claimed is:

1. A cleaning apparatus used for a carrier and a model fixed on the carrier, the cleaning apparatus comprising:
    a case body having an opening disposed at a top thereof, an outlet disposed at a bottom thereof, and a receiving space disposed between the opening and the outlet;
    a sprinkling unit installed in the case body, the sprinkling unit having a plurality of nozzles which are configured corresponding to the receiving space;
    a switching valve installed at the outlet on the bottom surface of the case body to open or close the outlet; and
    a rotating mechanism configured corresponding to the opening and connected to the carrier and being able to rotate the carrier, wherein the model passes through the opening and is disposed in the receiving space,
    wherein the rotating mechanism comprises a rotating disk, the rotating disk has a through hole configured corresponding to the opening, wherein an inner wall of the through hole extends to form a stopper, wherein the carrier passes through the through hole and hooks on the stopper, so that the carrier is suspended inside the receiving space without contacting the bottom surface of the case body.

2. The cleaning apparatus according to claim 1, wherein the rotating mechanism comprises a driver and a gear part, wherein the driver drives the gear part to rotate, wherein the rotating disk is configured corresponding to the opening and can be fixed to the carrier, wherein the rotating disk has an external gear around an outer perimeter thereof, wherein the gear part is engaged with the external gear to rotate the rotating disk.

3. The cleaning apparatus according to claim 1, wherein the case body has an inner annular wall which extends along an inner perimeter thereof to form at least one positioning block, wherein the carrier rests against the at least one positioning block.

4. The cleaning apparatus according to claim 1, further comprising a liquid container disposed outside of the case body and configured corresponding to the outlet for receiving cleaning liquid discharged from the outlet.

5. The cleaning apparatus according to claim 4, further comprising a filter unit configured between the outlet and the liquid container.

6. The cleaning apparatus according to claim 5, further comprising a circulation unit connected to the liquid container and the sprinkling unit.

7. The cleaning apparatus according to claim 6, wherein the circulation unit comprises a circulation pipe and a pump which are connected to each other, wherein the circulation pipe is connected to the liquid container and the sprinkling unit.

8. A cleaning apparatus used for a carrier and a model fixed on the carrier, the cleaning apparatus comprising:
- a case body having an opening disposed at a top thereof, an outlet disposed at a bottom thereof, and a receiving space disposed between the opening and the outlet;
- a sprinkling unit installed in the case body, the sprinkling unit having a plurality of nozzles which are configured corresponding to the receiving space;
- a switching valve installed at the outlet on the bottom of the case body to open or close the outlet;
- a rotating mechanism configured corresponding to the opening and connected to the carrier and being able to rotate the carrier, wherein the model passes through the opening and is disposed in the receiving space;
- a liquid container fixed under of the case body and covering the outlet for receiving cleaning liquid discharged from the outlet;
- a connecting unit correspondingly connecting the case body and the liquid container;
- a filter unit configured between the outlet and the liquid container; and
- a circulation unit connected to the liquid container and the sprinkling unit, wherein the circulation unit comprises a circulation pipe and a pump which are connected to each other, wherein the circulation pipe is connected to the liquid container and the sprinkling unit, wherein the rotating mechanism comprises a rotating disk, the rotating disk has a through hole configured corresponding to the opening, wherein an inner wall of the through hole extends to form a stopper, wherein the carrier passes through the through hole and hooks on the stopper, so that the carrier is suspended inside the receiving space without contacting the bottom of the case body.

9. The cleaning apparatus according to claim 8, wherein the rotating mechanism comprises a driver and a gear part, wherein the driver drives the gear part to rotate, wherein the rotating disk is configured corresponding to the opening and can be fixed to the carrier, wherein the rotating disk has an external gear around an outer perimeter thereof and engaged with the gear part to rotate the rotating disk.

10. The cleaning apparatus according to claim 8, wherein the case body has an inner annular wall which extends along an inner perimeter thereof to form at least one positioning block, wherein the carrier rests against the positioning block.

* * * * *